Figure 7:
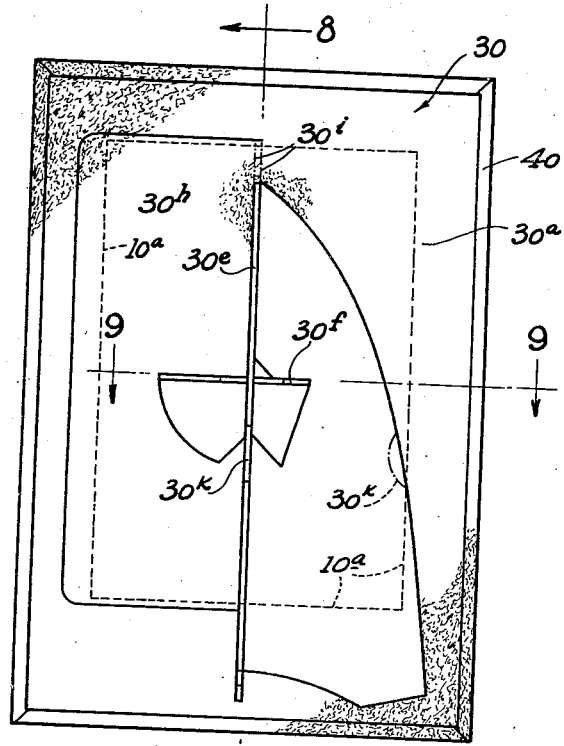

Sept. 5, 1939.  L. A. CHILCOTE  2,172,273
PICTURE MOUNT
Filed July 1, 1939  3 Sheets-Sheet 1
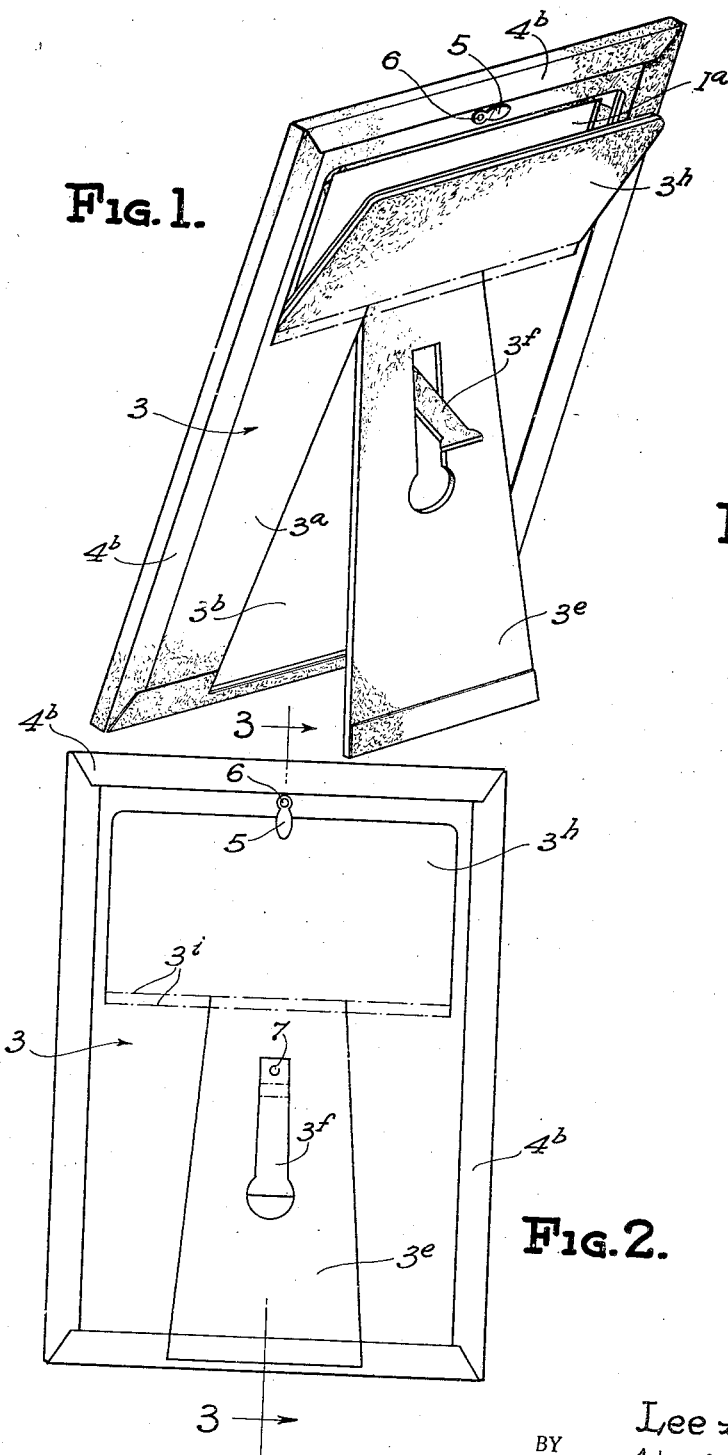
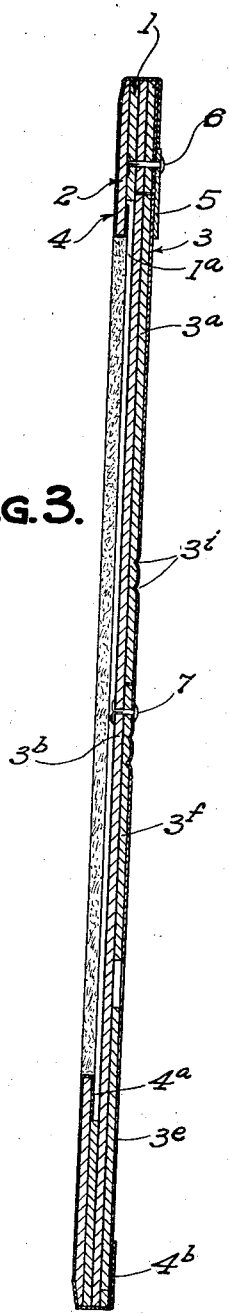
INVENTOR.
Lee A. Chilcote
BY Hull, Brock & West
ATTORNEYS.

Sept. 5, 1939.   L. A. CHILCOTE   2,172,273
PICTURE MOUNT
Filed July 1, 1939   3 Sheets-Sheet 2
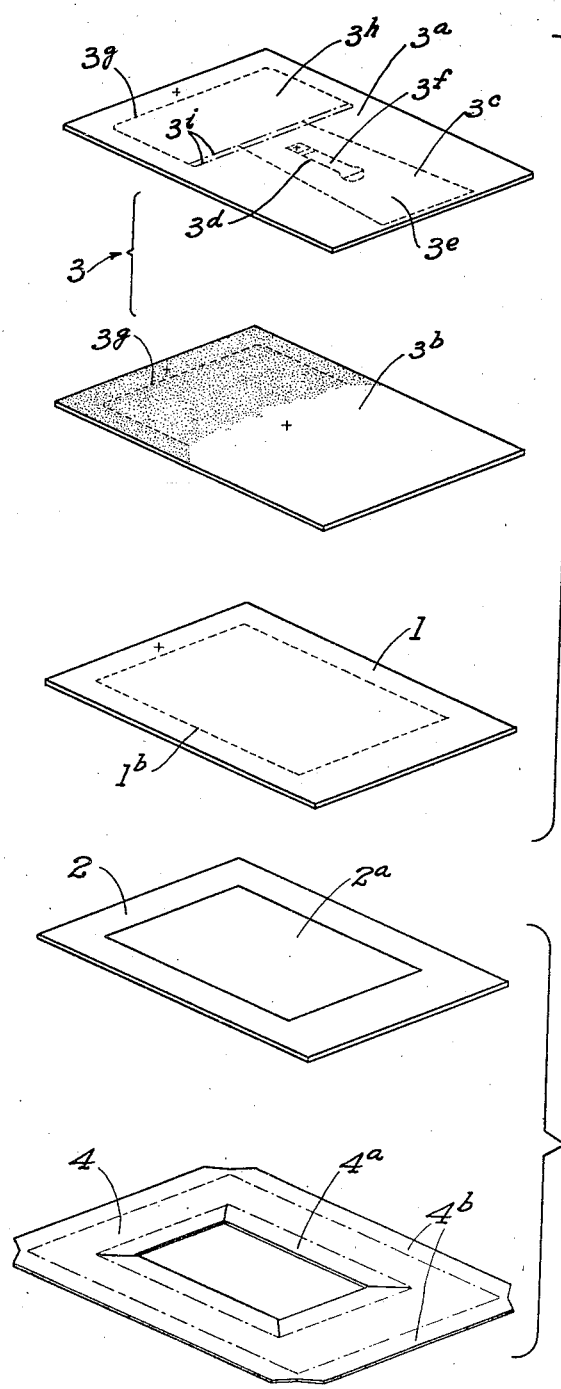
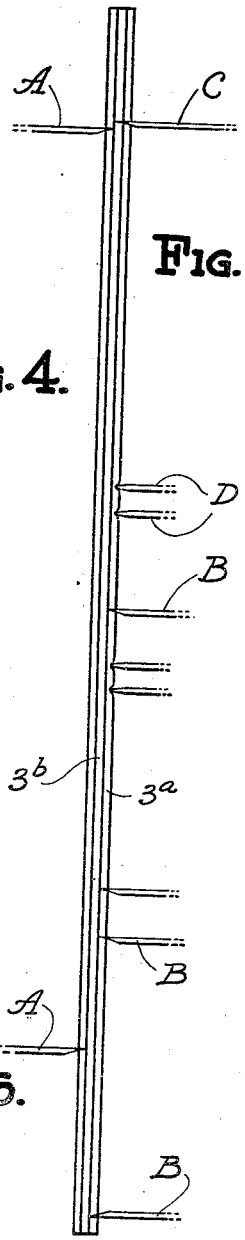
INVENTOR.
Lee A. Chilcote
BY Hull, Brock West
ATTORNEYS.

Sept. 5, 1939.　　　L. A. CHILCOTE　　　2,172,273
PICTURE MOUNT
Filed July 1, 1939　　　3 Sheets-Sheet 3

INVENTOR.
Lee A. Chilcote
BY Hull, Brock & West
ATTORNEYS.

Patented Sept. 5, 1939

2,172,273

UNITED STATES PATENT OFFICE 2,172,273

PICTURE MOUNT

Lee A. Chilcote, Gates Mills, Ohio, assignor to The Chilcote Company, Cleveland, Ohio, a corporation of Ohio Application July 1, 1939, Serial No. 282,485

6 Claims. (Cl. 40—152.1)

This invention relates to picture mounts of the class of those disclosed in my copending applications Serial Nos. 238,634 and 238,635, filed November 3, 1938.

The mounts shown in the applications referred to are desirably constructed of cardboard and each comprises, generally, a spacing member containing a so-called picture well for receiving a picture or like object to be displayed and a pane of glass or a sheet of other transparent protective material. A front frame is applied to the obverse side of the spacing member, and a back board to the reverse side thereof. The back board is provided with a picture inserting opening normally closed by a door formed by the material struck from said opening; and, as pointed out in said applications, an easel strut may be suitably fastened to the back board, in accordance with the usual custom, meaning that the strut was glued or riveted thereto.

When several mounts so equipped with easel struts are stacked one upon another for shipment or storage they are liable to warp because the portion of each mount surrounding the strut is unsupported. It has been found advantageous for this and other reasons to produce the strut from an integral portion of the back board by cutting the back board along a line defining the strut so that when the mount is not in use the strut may be left in the same plane as the surrounding portion of the back board and thus obviate warping of the mount from the above cause.

The main object of my present invention is to produce a picture mount including a back board made up of two distinct layers of material, and to cut an easel strut, desirably with its brace, from one layer, and a door from both layers thereby to produce a picture opening entirely through the back board that leads into the picture well when the parts are assembled. Prior to cutting as above, the two layers are secured together, as by a suitable adhesive, within or substantially throughout the area of the door and, if desired, about the strut. It is important, however, that no adhesive be within the area of the strut and the free portion of its brace as otherwise the strut and brace could not be swung out from the plane of the back board when the mount is placed in use.

Another object is to so relate the strut and door that the same scoring defines the hinged edges of both elements.

Other objects of a more general nature will appear as I proceed to describe the invention in detail by reference to the accompanying drawings wherein Fig. 1 is a rear perspective view, and Fig. 2 a straight rear elevation, of a picture mount incorporating one form of the invention; Fig. 3 is a section on the line 3—3 of Fig. 2 and on a scale considerably enlarged over that of the preceding views; Fig. 4 is a perspective view of the two layers of material that constitute the back board and the sheet of material from which the spacing member is formed, the parts being shown as separated and having indicated thereon by dotted lines the way in which they are cut and scored to produce, in the layers of the back board, the easel strut and picture inserting opening and, in the frame member, the picture well; Fig. 5 is a sectional view through the two layers of the back board and the spacing member stacked for cutting and scoring, and indicating in dotted lines the cutting and scoring devices; Fig. 6 is a perspective view of the front frame and the blank of decorative sheet material that covers the front frame and the edge portions of the spacing member, and back board when the parts are assembled; Fig. 7 is a rear view of a modified form of the invention, and Figs. 8 and 9 are enlarged sections on the respective lines 8—8 and 9—9 of Fig. 7.

Figure 8:
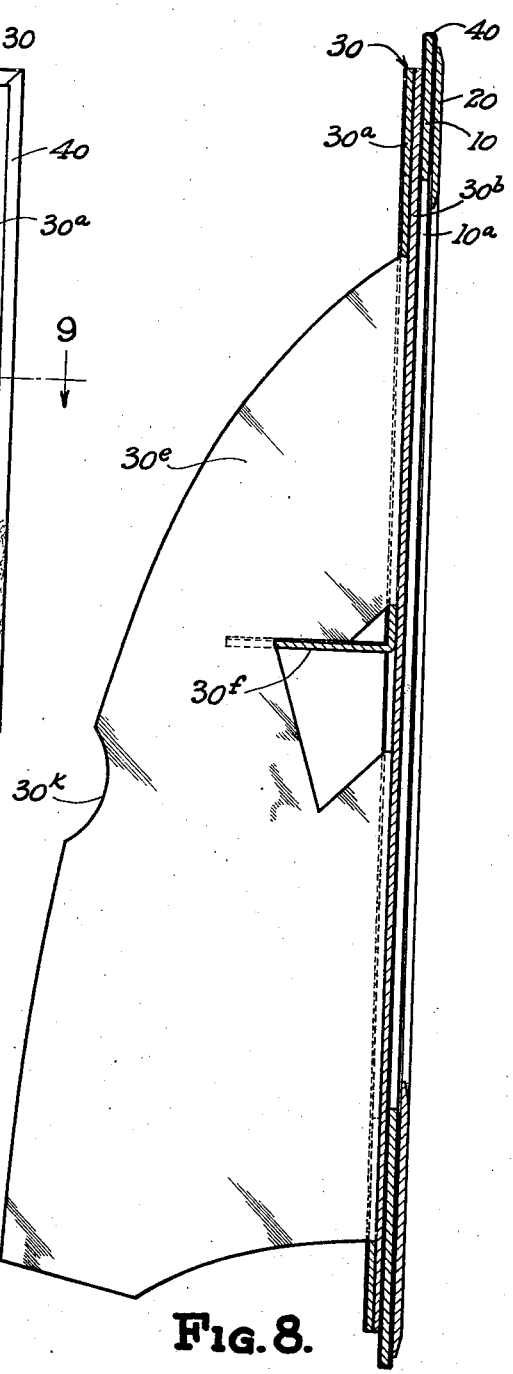
Figure 9:
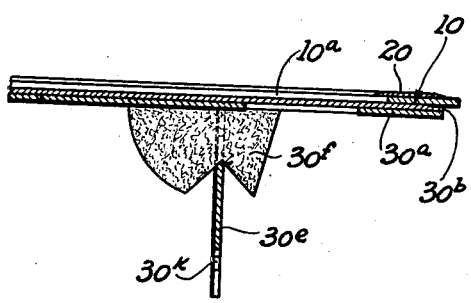

The general construction of the mount illustrated in Figs. 1-6 is the same as that disclosed in the aforesaid application Serial No. 238,635, while the structure of the mount shown in Figs. 7-9 corresponds to that disclosed in the other of the aforesaid applications Serial No. 238,634.

Briefly, the mount shown in Figs. 1-6 comprises a spacing member 1, a front frame 2, a back board 3, and a blank 4 of relatively thin sheet material, desirably a durable and decorative paper. The spacing member 1 consists of a rectangular piece of cardboard or other suitable material, and, as herein illustrated, a rectangular opening is cut substantially centrally of said member to provide a picture well 1ª, the outline of said well being indicated in dotted lines at 1ᵇ in Fig. 4. The front frame 2 has an opening 2ª that is somewhat smaller than the picture well and is arranged in axial alignment therewith so that the inner edge portion of the front frame overhangs the picture well a suitable distance, this being for the obvious purpose of confining the picture or other display object, with its pane of glass or sheet of other transparent protective material, within the well. The body portion of the blank 4 is of substantially the same size and shape as the front frame, and said blank includes flaps 4ª that surround its opening, and end and side flaps 4ᵇ that constitute the peripheral portion of the blank. The blank 4 is applied to the front frame 2 and its flaps 4ᵃ are turned inwardly about the edge of the front frame surrounding the opening 2ᵃ and the peripheral flaps 4ᵇ are drawn snugly about the edge portions of the spacing member and back board and are extended over the back board, in the manner indicated in Figs. 1, 2 and 3, the entire blank, or at least its flaps 4ᵃ and 4ᵇ, being secured to the underlying portions of the mount by a suitable adhesive. Desirably a sheet of material the same as that constituting the blank 4 is attached by an adhesive to the outer surface of the back board prior to the cutting of the back board as hereinafter described.

The back board 3 is made up of two distinct layers of cardboard or other suitable material, the outer and inner layers being designated 3ᵃ and 3ᵇ, respectively, the former layer desirably having applied to its outer surface the sheet of decorative material, as above explained. In preparing the back board 3 and spacing member 1 for cutting and scoring along the dotted lines appearing in Fig. 4, they are stacked together, as indicated in Fig. 5, and the two layers of the back board are preferably secured together by an adhesive throughout the stippled area shown in Fig. 4, this being within the region of the door that normally closes the picture inserting opening in the back board. With the parts so stacked together, the spacing member 1 may first be cut along the dotted line 1ᵇ (Fig. 4) by suitable devices or knives, designated A in Fig. 5, so as to sever from the marginal portion of the spacing member a blank that is removed to form the picture well 1ᵃ. If, as suggested, the spacing member is cut before the back board, said blank is not instantly removed, but is left to provide a suitable support for the overlying portion of the back board during the cutting and scoring of the latter. Cutting devices or knives B are set in a suitable holder (not shown) in such manner as to penetrate only the outer layer 3ᵃ when operated to cut said layer along the dotted lines 3ᶜ and 3ᵈ to produce the easel strut 3ᵉ and the brace 3ᶠ therefore; while a cutting device or knife C is set relatively deeper than the device or knife B so as to penetrate both layers and thus produce a picture inserting opening that extends entirely through the back board, the cut produced by the device or knife C being indicated, on both blanks 3ᵃ and 3ᵇ of Fig. 4, by the dotted lines 3ᵍ. The cut thus produced defines a door 3ʰ, and the hinged edge of the door, as well as that of the easel strut 3ᵉ, is marked by scores 3ⁱ produced by scoring rules or devices indicated at D in Fig. 5.

While the back board and spacing member are stacked together, a button 5 may be secured by a rivet 6 to the assemblage, said rivet desirably extending through the two layers of the back board and through the spacing member, as shown in Fig. 3; and after removal of the blank from the picture well, a rivet 7 may be clinched through the base portion of the strut brace 3ᶠ and the underlying portion of the inner layer 3ᵇ of the back board.

With the spacing member and back board fabricated as described and the central portion of the former removed to leave the picture well 1ᵃ, the blank 4 of decorative paper or similar material is secured to the front frame, especially about the opening of the latter in the manner above described, and the front frame is then applied to the spacing member, and the peripheral flaps 4ᵇ of the blank 4 are drawn about and secured to the marginal portion of the back board. If the lower flap 4ᵇ of the blank 4 is as wide as shown in the drawings, it will cover the lower end of the easel strut, and said flap may immediately or anytime before the mount is put in use be severed along the line of cleavage between the end of the strut and the surrounding portion of the back board so as to free the strut. When the mount is in readiness for use, the door 3ʰ (after the button 5 has been turned to ineffective position) may be opened, as indicated in Fig. 1, and the picture or other object, with the pane or sheet of protective material, inserted through the opening thus provided into the picture well 1ᵃ, after which the door may be closed and the button 5 turned to effective position. To place the mount in condition to stand alone, the brace 3ᶠ is first drawn outward through the narrow portion of the slot in the strut 3ᵉ and the strut is swung into angular relation to the back board, the brace 3ᶠ serving to hold the strut in any desired angular relation to the back board within the limits of adjustment.

It is to be noted that the ends of the cut that defines the door 3ʰ intersect the scores 3ⁱ; and that likewise the end portions of the cut that defines the strut 3ᵉ intersect said scores wherefore the same scores serve to mark the hinge connections between both the door and strut and the back board.

In the form of the invention illustrated in Figs. 7-9, the marginal portion of the spacing member 10 is bound by an element 40 consisting of a piece of durable decorative material, and applied to the front of said member in overlapping relation to said element 40 is a front frame 20 having an opening registering with but somewhat smaller than the picture well 10ᵃ of the spacing member. The back board 30 is made up of layers 30ᵃ and 30ᵇ, and from the former is cut a strut 30ᵉ and a brace 30ᶠ therefor. The hinged edge of the strut 30ᵉ is defined by vertical scores 30ⁱ that are substantially midway between the lateral edges of the back board, and these scores also define the hinged edge of a door 30ʰ that normally closes the picture inserting opening that leads into the well 10ᵃ. The two layers may be secured together by a suitable adhesive throughout their entire marginal portions and throughout all or part of the area of the door 30ʰ, the only parts which need be left entirely free from adhesive being that underlying the portions of the outer layer that constitute the strut 30ᵉ and its brace 30ᶠ. After the back board is cut to provide the strut, brace and door, it is securely affixed by a suitable adhesive to the rear side of the spacing member 10. Before being placed in use, the strut 30ᵉ and the brace 30ᶠ repose within the plane of the outer layer of the back board, and the strut is notched at 30ᵏ to facilitate grasping the free edge thereof for the purpose of swinging the strut to effective position. When the strut is swung to substantially right angular relation to the plane of the back board, the brace 30ᶠ is turned up into similar relation thereto within an opening of the strut from which a part of said brace is struck so as to secure the strut in operative position. By this same means the door is held closed. In other words, the brace 30ᶠ, extending as it does a substantial distance across the door and being confined within the notch of the strut, serves to retain the door in closed position. It therefore becomes necessary to insert the picture etc. before conditioning the strut for use.

Having thus described my invention, what I claim is:

1. A picture mount including a spacing member provided with a picture well, and a back board secured to the rear side thereof, said back board comprising two distinct layers of material, a strut defined by a cut that extends through only the outer layer, and a door defined by a cut that penetrates both layers thereby to provide a picture inserting opening that leads into the picture well, the layers being secured together within the area of the door and being free from each other throughout the area of the strut.

2. A picture mount including a spacing member provided with a picture well, and a back board secured to the rear side thereof, said back board comprising two distinct layers of material, the back board being provided with a straight score, a door defined by a cut that penetrates both layers of the back board thereby to provide a picture inserting opening that leads into the picture well, the portions of the cut along opposed edges of the door intersecting said score, and a strut defined by a cut that extends through only the outer layer of said board, the portions of the cut along opposed edges of the strut also intersecting said score, the layers being secured together throughout portions of their areas including all or part of the door but excluding the strut.

3. A picture mount including a spacing member provided with a picture well, and a back board secured to the rear side thereof, said back board comprising two distinct layers of material, a strut defined by a cut that extends through only the outer layer, a door defined by a cut that penetrates both layers thereby to provide a picture inserting opening that leads into the picture well, the layers being secured together within the area of the door and being free from each other throughout the area of the strut, holding means for the free edge of the door, and a fastening device by which said means is movably attached to the mount adjacent said edge of the door, said device passing through the two layers of the back board and through the spacing member.

4. A picture mount including a spacing member provided with a picture well, and a back board secured to the rear side thereof, said back board comprising two distinct layers of material, the back board being provided with a vertical score about midway between its lateral edges, a door defined by a cut that penetrates both layers of the back board thereby to provide a picture inserting opening that leads into the picture well, the portions of the cut along opposed edges of the door intersecting said score, and a strut defined by a cut that extends through only the outer layer of said board, the portions of the cut adjacent the ends of the strut also intersecting said score, the layers being secured together throughout portions of their areas including all or part of the door but excluding the strut.

5. A picture mount including a spacing member provided with a picture well, and a back board applied to the rear side thereof, said back board comprising two distinct layers of material and being provided with a score, a strut defined by a cut that penetrates only the outer layer of the back board and which cut intersects the aforesaid score adjacent the ends of the strut, a door defined by a cut that penetrates both layers of the back board and intersects said score adjacent the ends of the door, the back board being provided with a second score that crosses the first score and extends a substantial distance in both directions beyond the same into the areas of the door and strut, a brace defined by a cut that penetrates ony the outer layer of the back board and the ends of which intersect the second score at points remote from the latter's intersection of the first score, the strut being adapted to be swung to operative position in angular relation to the plane of the back board on a hinge defined by the first mentioned score, and the brace being adapted to be turned into angular relation to the plane of the back board on a hinge defined by the second score and arranged to cooperate with the strut to hold the latter in operative position, the brace when in such position serving also to retain the door closed.

6. A picture mount including a spacing member provided with a picture well, and a back board secured to the rear side thereof, said back board comprising two distinct layers of material, the back board being provided with a vertical score about midway between its lateral edges and with a substantially horizontal score intersecting the first score and extending a substantial distance on both sides thereof, a door defined by a cut that penetrates both layers of the back board thereby to provide a picture inserting opening that leads into the picture well, the portions of the cut along opposed edges of the door intersecting the first mentioned score, a strut defined by a cut that extends through only the outer layer of said board, the portions of the cut adjacent the ends of the strut also intersecting said first mentioned score, a brace defined by a cut penetrating only the outer layer of the back board and which cut intersects the second mentioned score substantial distances on opposite sides of the first score, the brace thus being formed from an integral part struck from both the door and strut whereby a notch is formed in the strut adjacent the hinged edge thereof, the brace being adapted to be turned into angular relation to the plane of the back board into said notch and to cooperate with the strut in such manner as to hold the strut in operative position and the door in closed position, the layers of the back board being secured together throughout portions of their areas including at least a part of the door but excluding the strut and brace.

LEE A. CHILCOTE.